United States Patent
Foster et al.

(10) Patent No.: US 10,052,683 B2
(45) Date of Patent: Aug. 21, 2018

(54) CENTER PLENUM SUPPORT FOR A MULTIWALL TURBINE AIRFOIL CASTING

(71) Applicant: General Electric Company, Schenectady, NY (US)

(72) Inventors: Gregory Thomas Foster, Greer, SC (US); David Wayne Weber, Simpsonville, SC (US); Michelle Jessica Iduate, Simpsonville, SC (US); Brendon James Leary, Simpsonville, SC (US); Joseph Anthony Weber, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 289 days.

(21) Appl. No.: 14/977,028

(22) Filed: Dec. 21, 2015

(65) Prior Publication Data

US 2017/0173672 A1    Jun. 22, 2017

(51) Int. Cl.
*B22C 9/24* (2006.01)
*B22C 9/10* (2006.01)
*F01D 5/18* (2006.01)
*G01B 17/02* (2006.01)

(52) U.S. Cl.
CPC ............. *B22C 9/103* (2013.01); *B22C 9/108* (2013.01); *B22C 9/24* (2013.01); *F01D 5/187* (2013.01); *G01B 17/02* (2013.01); *F05D 2220/32* (2013.01); *F05D 2230/21* (2013.01); *F05D 2260/20* (2013.01)

(58) Field of Classification Search
CPC .......... B22C 9/103; B22C 9/108; B22C 9/24; F01D 5/187; G01B 17/02; F05D 2220/32; F05D 2230/21; F05D 2260/20

USPC ........................................................... 73/596
See application file for complete search history.

(56) References Cited

U.S. PATENT DOCUMENTS

| | | | | |
|---|---|---|---|---|
| 3,210,997 A | * | 10/1965 | Karlby | G01F 1/1155 73/861.92 |
| 4,252,068 A | * | 2/1981 | Nolan | B61G 9/24 105/199.4 |
| 5,046,866 A | * | 9/1991 | Mulcahy | B61F 5/14 384/423 |
| 5,296,308 A | | 3/1994 | Caccavale et al. | |
| 5,820,774 A | * | 10/1998 | Dietrich | B22C 9/10 164/369 |
| 5,853,044 A | | 12/1998 | Wheaton et al. | |

(Continued)

FOREIGN PATENT DOCUMENTS

EP       1 559 500 A1    8/2005
WO     2007/008571 A1    1/2007

OTHER PUBLICATIONS

Partial European Search Report and Opinion issued in connection with corresponding EP Application No. 16203126.4 dated May 4, 2017.

(Continued)

*Primary Examiner* — J M Saint Surin
(74) *Attorney, Agent, or Firm* — Ernest G. Cusick; Hoffman Warnick LLC

(57) ABSTRACT

A core for a turbine airfoil casting according to an embodiment includes: a center plenum section; and a plurality of outer passage sections; wherein the center plenum section includes at least one boss extending outwardly from the center plenum to an outer profile of the core.

17 Claims, 9 Drawing Sheets

(56) References Cited

U.S. PATENT DOCUMENTS

| | | | |
|---|---|---|---|
| 6,347,660 B1 * | 2/2002 | Sikkenga | B22C 7/026 164/137 |
| 6,761,534 B1 * | 7/2004 | Willett | F01D 5/18 416/191 |
| 6,806,703 B2 | 10/2004 | Le Bihan et al. | |
| 7,550,968 B2 | 6/2009 | Joubert et al. | |
| 2004/0094287 A1 * | 5/2004 | Wang | B22C 9/10 164/361 |
| 2005/0247429 A1 * | 11/2005 | Turkington | B22C 7/026 164/516 |
| 2010/0129217 A1 | 5/2010 | Cherolis et al. | |
| 2013/0167647 A1 | 7/2013 | Bailey et al. | |
| 2016/0177741 A1 | 6/2016 | Kirollos et al. | |

OTHER PUBLICATIONS

Extended European Search Report and Opinion issued in connection with corresponding EP Application No. 16203126.4 dated Oct. 20, 2017.

* cited by examiner

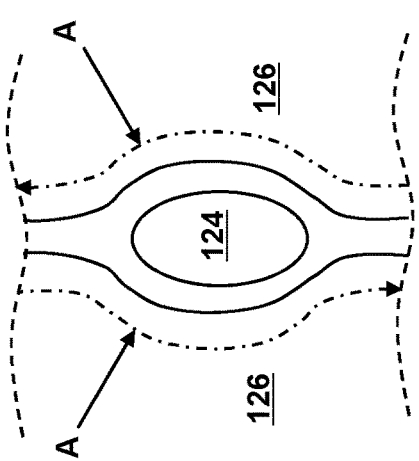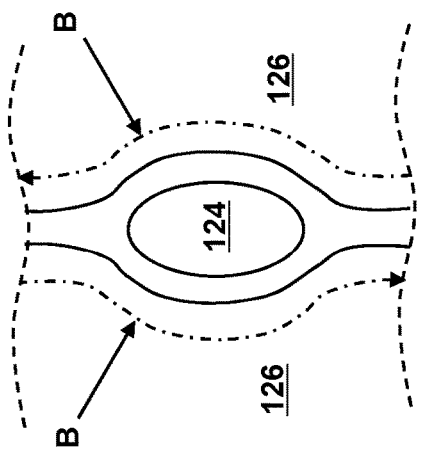

CENTER PLENUM SUPPORT FOR A MULTIWALL TURBINE AIRFOIL CASTING

BACKGROUND OF THE INVENTION

The disclosure relates generally to turbine systems, and more particularly, to a center plenum support for a multiwall turbine airfoil casting.

Traditional means for providing location and rib wall thickness control for the center plenum of a multiwall or double wall casting have been through the use of bumpers between the center plenum and the outer cooling passages. Bumpers are a raised pad on either the center plenum or cooling passages that limits the gap between these two features. Ideally, the bumpers would not touch, but occasionally they do, leaving a hole between the two cavities in the casting process. The number of holes formed from these connections is unknown, leading to uncertainty in the cooling flow distribution in the part.

BRIEF DESCRIPTION OF THE INVENTION

A first aspect of the disclosure provides a core for a turbine airfoil casting including: a center plenum section; and a plurality of outer passage sections; wherein the center plenum section includes at least one boss extending outwardly from the center plenum to an outer profile of the core.

A second aspect of the disclosure provides a method for forming a core for a casting, comprising: positioning a first side of a core on a first setter block, the core comprising a center plenum section and a plurality of outer passage sections, wherein the center plenum section includes at least one boss extending outwardly from the center plenum to an outer profile of the core; closing a second setter block against the second side of the core; and heating the core.

A third aspect of the disclosure provides method for measuring a thickness $T_1$ of an inner wall of a multiwall airfoil, the inner wall located between an outer cooling passage and a central plenum of the multiwall airfoil, the central plenum including a protrusion extending toward an outer wall of the multiwall airfoil, the method including: obtaining a thickness measurement $T_2$ of an outer wall of the multiwall airfoil at a first point adjacent the outer cooling passage; and obtaining a thickness measurement $T_3$ of the outer wall of the multiwall airfoil at a second point adjacent the protrusion of the central plenum; wherein the thickness $T_1$ of the inner wall of the multiwall airfoil is given by $T_1=(T_3+D_1)-(T_2+D_2)$, wherein $D_1$ is a depth of the outer cooling passage and $D_2$ is a depth of the protrusion of the central plenum, and wherein $D_1$ and $D_2$ are known from corresponding dimensions of a core used to form the multiwall airfoil.

The illustrative aspects of the present disclosure solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure.

FIGS. 10 and 11 are plan views of a portion of a multiwall airfoil formed using the core of FIGS. 3 and 6, according to embodiments.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

As indicated above, the disclosure relates generally to turbine systems, and more particularly, to a center plenum support for a multiwall turbine airfoil casting.

Figure 1:
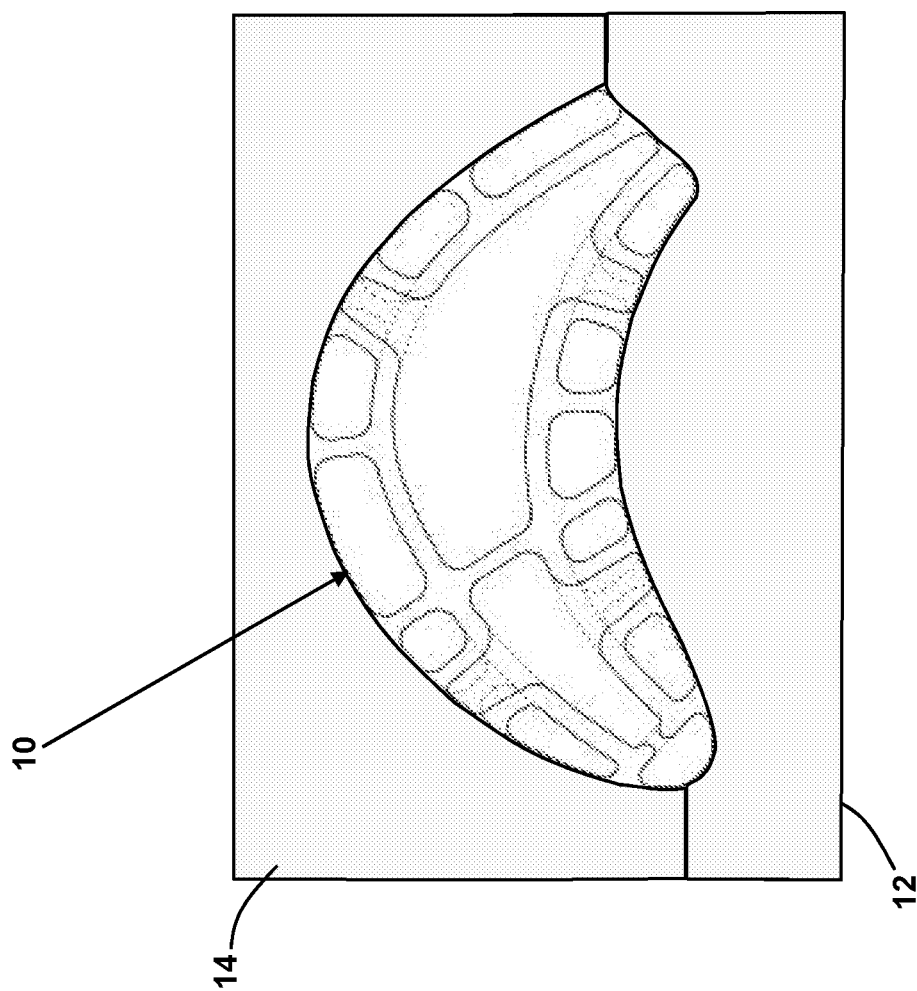
FIG. 1 is a cross-sectional view of a core disposed between upper and lower fire setter blocks, according to embodiments.
Figure 2:
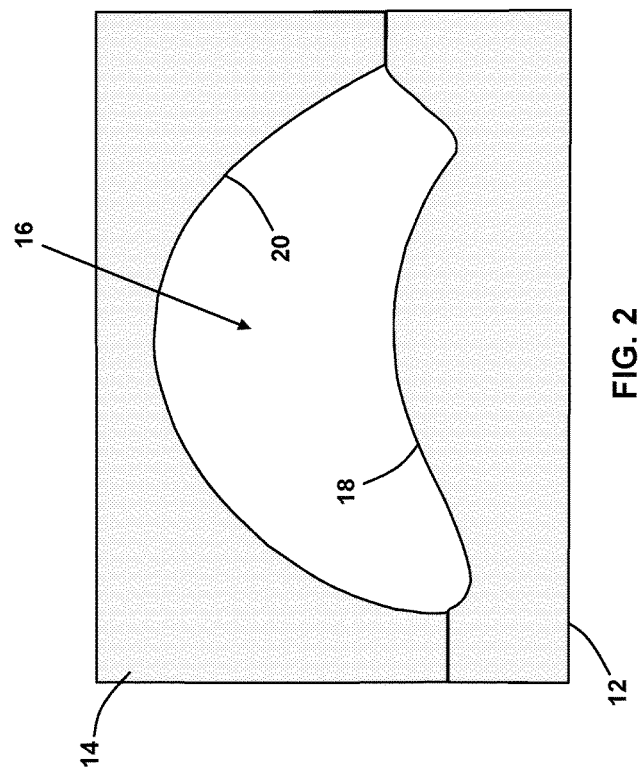
FIG. 2 depicts a cavity formed by the upper and lower fire setter blocks of FIG. 1, according to embodiments.

A setter fire step is often employed to control and correct the dimensions of a core (e.g., a ceramic core) used in the casting process of a multiwall airfoil (e.g., a multiwall turbine airfoil). As depicted in FIG. 1, this step involves, for example, positioning the core 10 in a lower setter block 12, closing an upper setter block 14 against the core 10 and the lower setter block 12, and performing a firing process. The lower and upper setter blocks 12, 14 form a cavity 16 (FIG. 2) defining the desired shape of the core 10. During the firing process, the core 10 heats up and softens. The weight of the upper setter block 14 against the softened core 10 conforms the core 10 to the shape of the cavity 16. As shown in FIG. 2, the cavity 16 is defined by the inner surfaces 18, 20 of the lower and upper setter blocks 12, 14.

Figure 3:
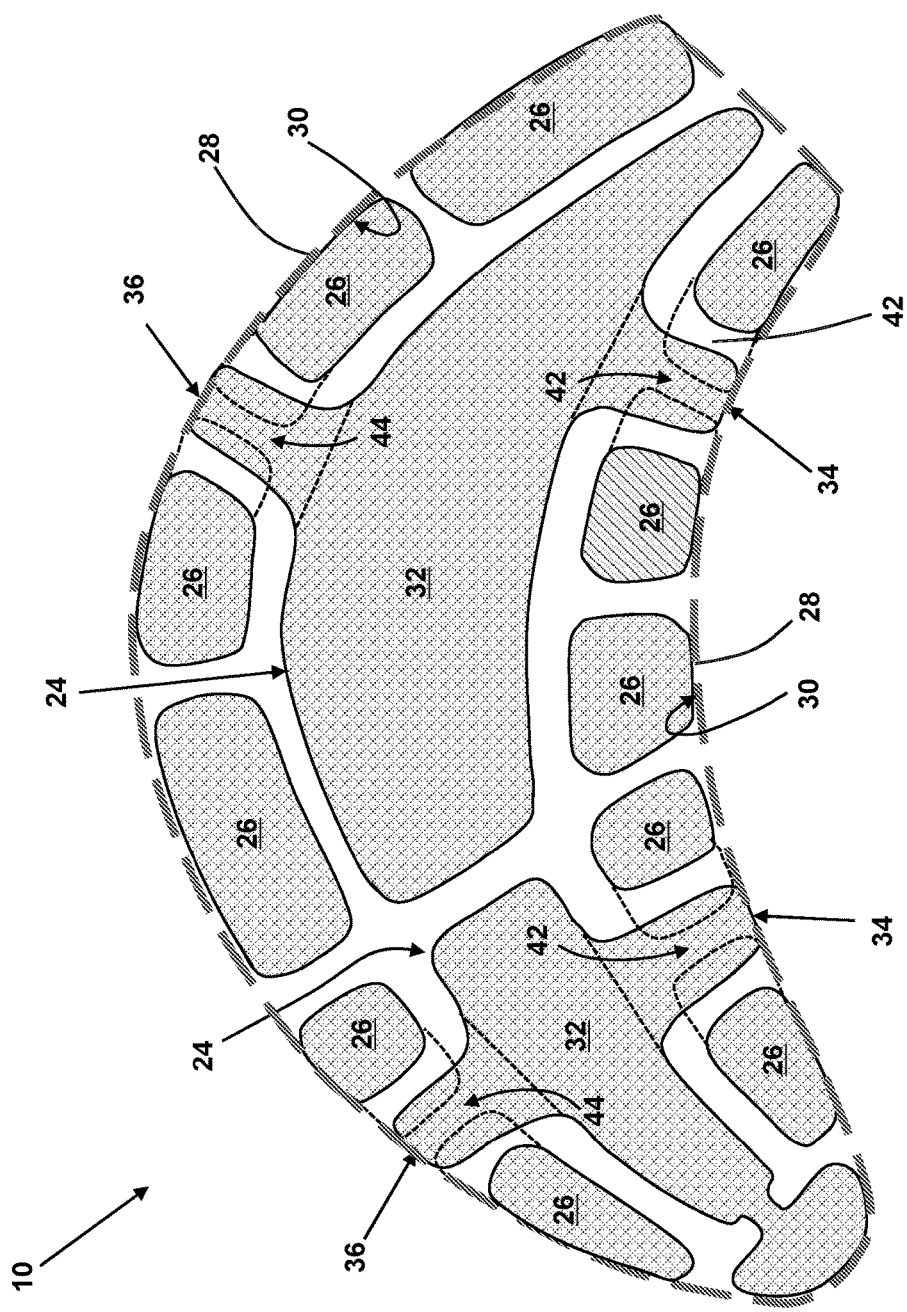
FIG. 3 is a first cross-sectional view of a core, according to embodiments.
Figure 8:
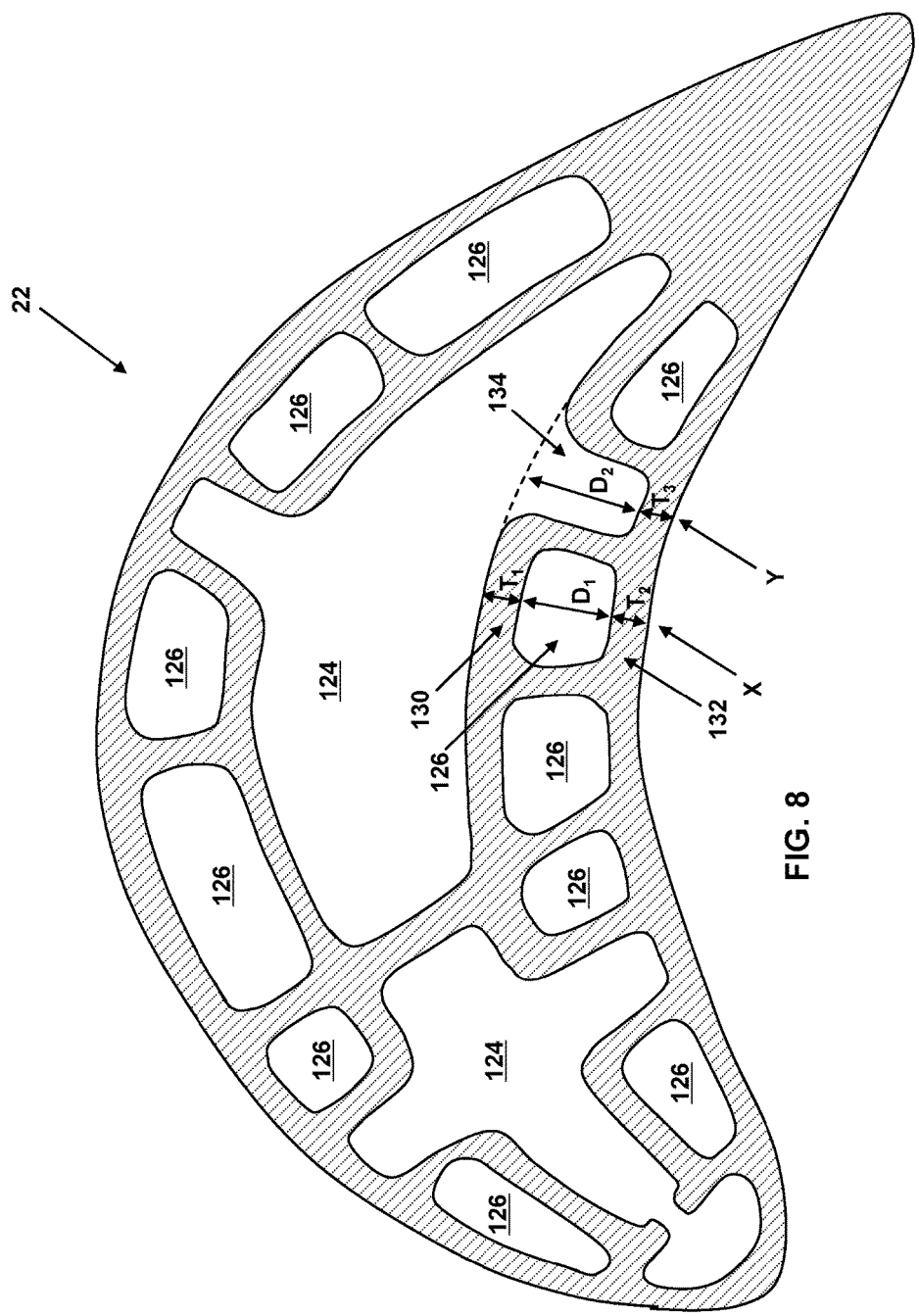
FIG. 8 is a first cross-sectional view of a multiwall airfoil formed using the core of FIGS. 3 and 6, according to embodiments.
Figure 9:
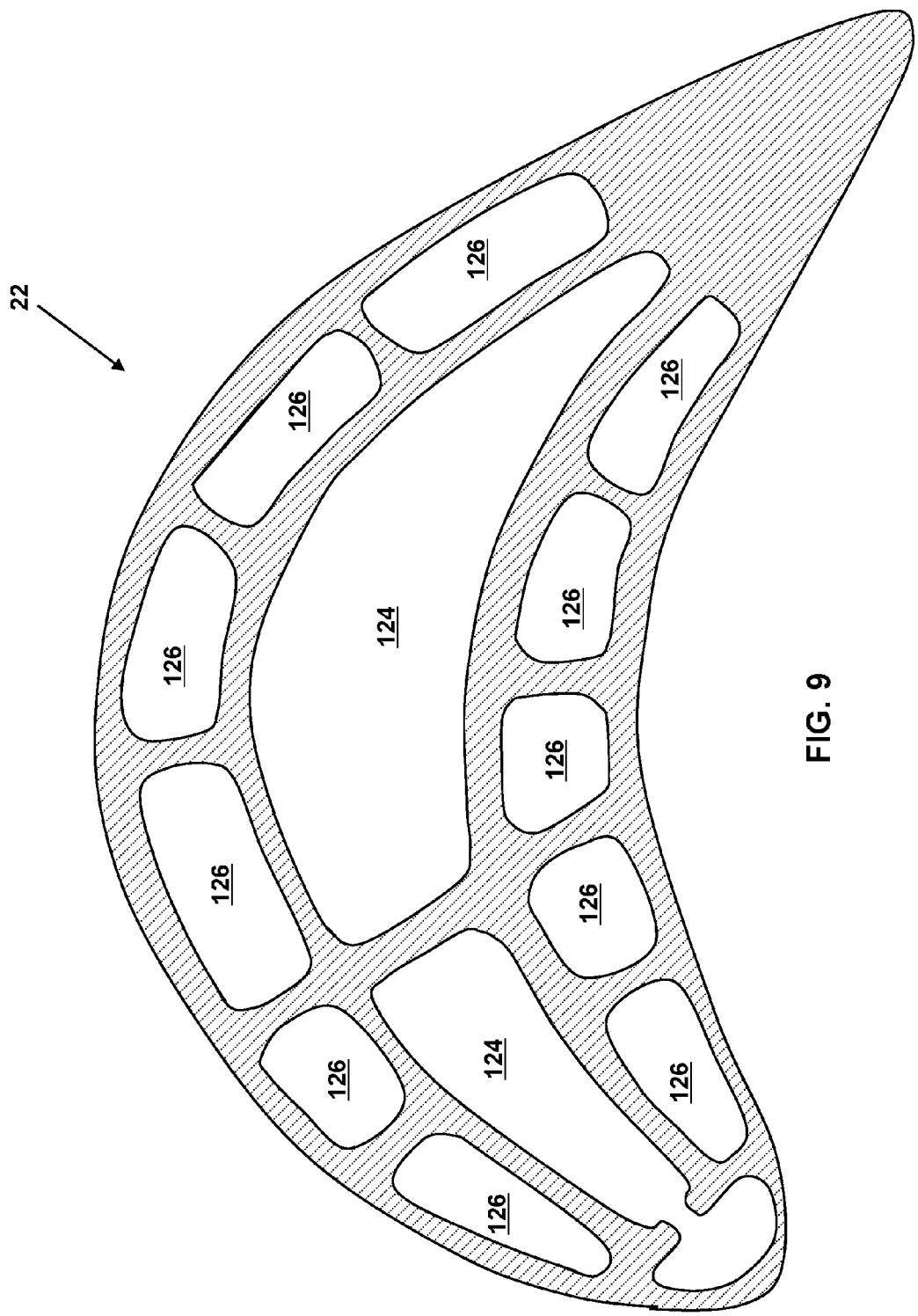
FIG. 9 is a second cross-sectional view of a multiwall airfoil formed using the core of FIGS. 3 and 6, according to embodiments.

The core 10 is used during the casting process of a multiwall airfoil 22 (see, e.g., FIGS. 8 and 9). As depicted in detail in FIG. 3, the core 10 includes a plurality of center plenum sections 24, which are configured to form center plenums 124 (FIGS. 8-11) of the multiwall airfoil 22, and a plurality of outer passage sections 26, which are configured to form outer cooling passages 126 (FIGS. 8-11) of the multiwall airfoil 22. The core 10 has an outer surface 28 that is at least partially defined by the exterior surfaces 30 of the outer passage sections 26.

According to embodiments, each center plenum section 24 includes a center section 32, at least one lower boss 34, and at least one upper boss 36. The lower and upper bosses 34, 36 extend outwardly from the center section 32 of the center plenum section 24 to, but not beyond, the outer surface 28 of the core 10. Each lower boss 34 is located on a "pressure" or concave side of the core 10, corresponding to the pressure side of a multiwall airfoil 22 (FIGS. 8, 9) formed using the core 10. Similarly, each upper boss 36 is located on the "suction" or convex side of the core 10, corresponding to a suction side of a multiwall airfoil 22 (FIGS. 8, 9) formed using the core 10. The lower and upper bosses 34, 36 are configured to control the position, and prevent the movement of, the center plenum sections 24 in the cavity 16 formed by the lower setter block 12 and upper setter block 14 during firing. As shown in FIGS. 3-5 and 7, each lower and upper boss 34, 36 may extend outwardly from the center plenum section 24 between a pair of the outer passage sections 26.

Figure 7:
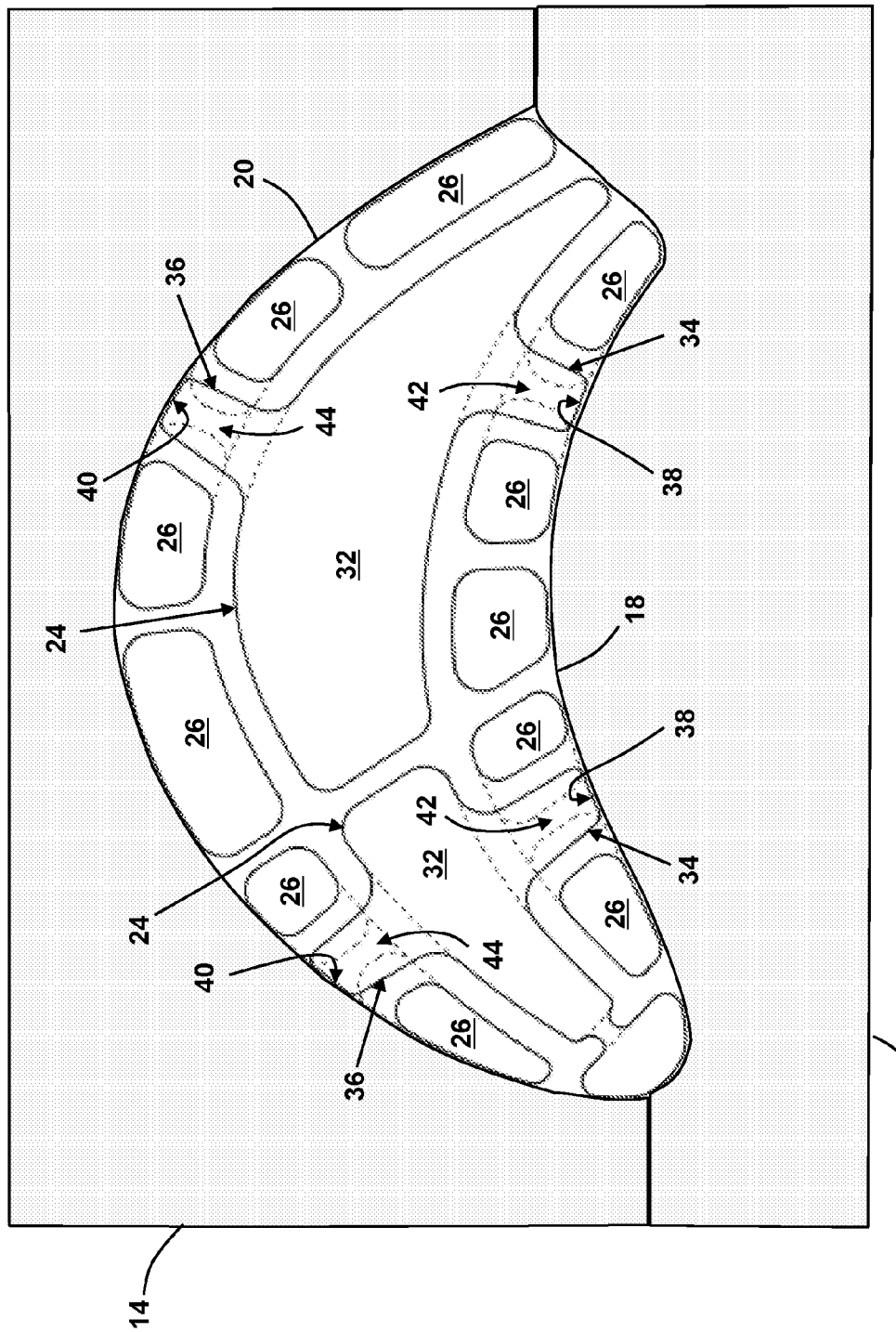
FIG. 7 is a cross-sectional view of the core of FIG. 3, disposed between upper and lower fire setter blocks, according to embodiments.

The lower and upper bosses 34, 36 are configured to be securely engaged by the inner surfaces 18, 20 of the lower and upper setter blocks 12, 14. To provide a secure engagement, as shown in FIG. 7, an outer contact surface 38 of each lower boss 34 has a contour that matches the contour of the inner surface 18 of the lower setter block 12 at the corresponding contact area. Similarly, the outer contact surface 40 of each upper boss 36 has a contour that matches the contour of the inner surface 20 of the upper setter block 14 at the corresponding contact area. Advantageously, unlike the related art, the lower bosses 34 and upper bosses 36 do not contact the outer passage sections 26, thereby preventing the formation of holes between the center plenums 124 and outer cooling passages 126 (FIGS. 8-11) of a multiwall airfoil 22 formed using the core 10.

Figure 4:
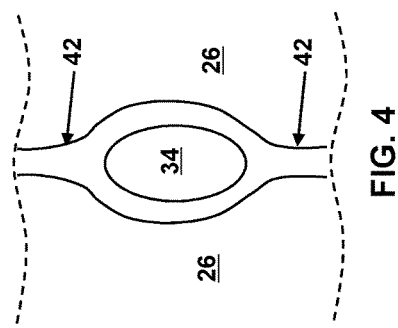
FIG. 4 is a plan view of a lower boss and adjacent outer passage sections of the core of FIG. 3, according to embodiments.

A plan view of a lower boss 34 and adjacent outer passage sections 26 is depicted in FIG. 4. A plan view of an upper boss 36 and adjacent outer passage sections 26 is depicted in FIG. 5.

Figure 6:
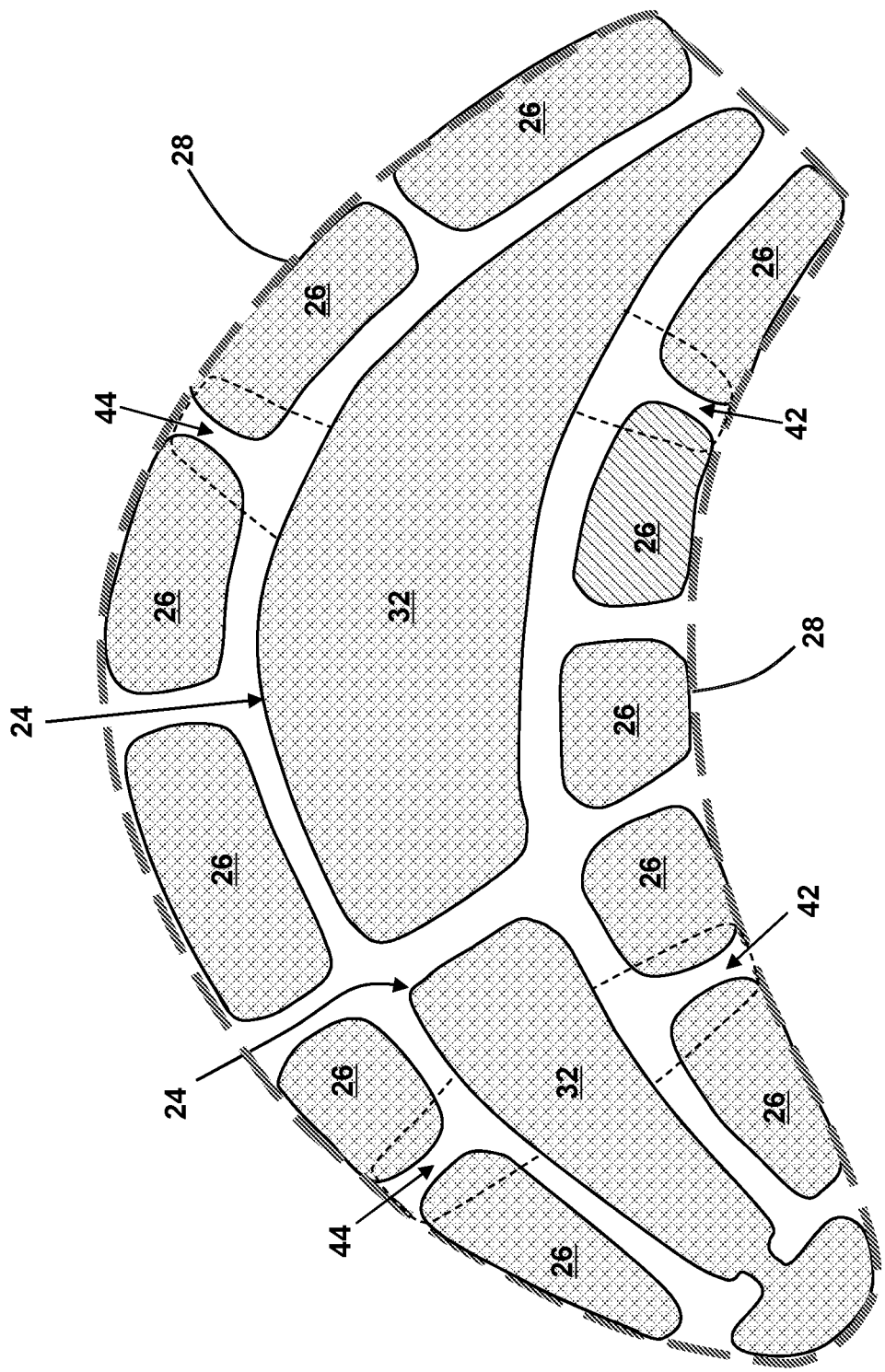
FIG. 6 is a second cross-sectional view of the core, according to embodiments.

As shown in FIG. 4, each lower boss 34 may have a substantially elliptical configuration. A channel 42 (see also FIGS. 3 and 7 (in phantom) and FIG. 6) diverges around a first end of the lower boss 34 and converges at a second end of the lower boss 34. To limit turbulence and pressure loss of air (represented by arrows A in FIG. 10) flowing through outer cooling passages 126 corresponding to the outer passage sections 26 of the core 10 on either side of the lower boss 34, the lower boss 34 may have a length to width ratio of about 3:1 to about 10:1. In a particular embodiment, a length to width ratio of about 7:1 may be used. Although described as elliptical, the lower boss 34 may have any other suitable configuration.

Figure 5:
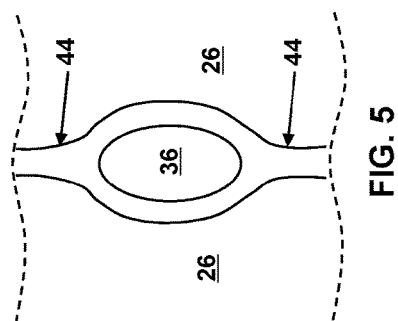
FIG. 5 is a plan view of an upper boss and adjacent outer passage sections of the core of FIG. 3, according to embodiments.

Similarly, as shown in FIG. 5, in embodiments, the upper boss 36 may also have a substantially elliptical configuration. A channel 44 (see also FIGS. 3 and 7 (in phantom) and FIG. 6) diverges around a first end of the upper boss 36 and converges at a second end of the upper boss 36. To limit turbulence and pressure loss of air (represented by arrow B in FIG. 11) flowing through outer cooling passages 126 corresponding to the outer passage sections 26 of the core 10 on either side of the upper boss 36, the upper boss 36 may have a length to width ratio of about 3:1 to about 10:1. In a particular embodiment, a ratio of about 7:1 may be used. Although described as elliptical, the upper boss 36 may have any other suitable configuration.

Figure 12:
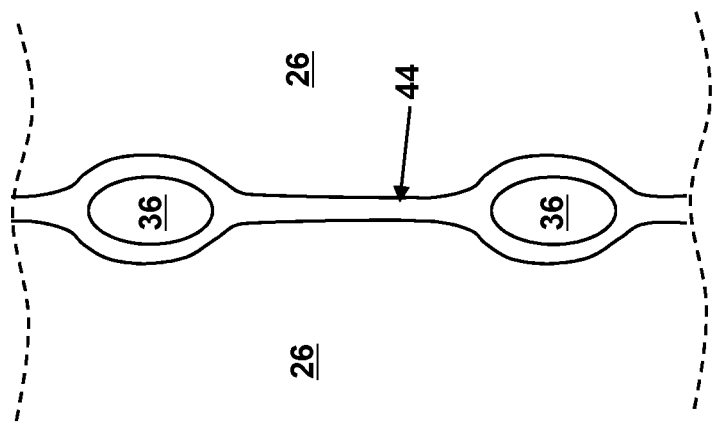
FIG. 12 is a plan view of a core including multiple lower bosses.
Figure 13:
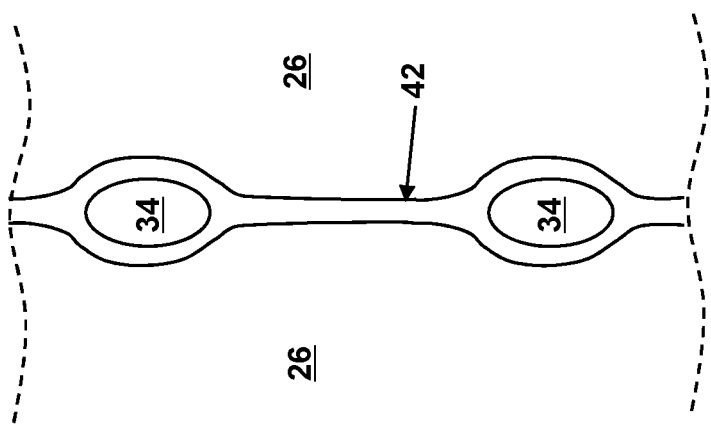
FIG. 13 is a plan view of a core including multiple upper bosses.

FIG. 12 is a plan view of the core 10 including multiple lower upper bosses 34. FIG. 13 is a plan view depicting the core 10 including multiple upper bosses 36. As depicted in FIG. 12, a channel 42 diverges around a first end of each lower boss 34 and converges at a second end of each lower boss 34. The channel 42 also connects a lower boss 34 to an adjacent lower boss 34. Similarly, as depicted in FIG. 13, a channel 44 diverges around a first end of each upper boss 36 and converges at a second end of each upper boss 36. The channel 44 also connects an upper boss 34 to an adjacent upper boss 34.

According to embodiments, the center plenum sections 24 provide positional control without the use of the bumpers, eliminating holes formed from the use of bumpers that potentially allow cooling flow to communicate between cavities (e.g., between the center plenums 124 and outer cooling passages 126 (FIGS. 8-11)). Further, better control of the position of the center plenum sections 24 results in a more tightly controlled rib wall thickness without the use of the bumpers, allowing the turbine blade to use less cooling air in a more deterministic solution, thus increasing the performance and output of the gas turbine. A direct line of contact of the lower and upper bosses 34, 36 of the center plenum sections 24 to the inner surfaces 18, 20 of the lower and upper setter blocks 12, 14 is created allowing the position of the central plenum sections 24 to be controlled independently of the outer cooling sections 26.

It has been difficult and expensive to measure the thickness of an inner wall of a multiwall airfoil, often requiring MRI measurements. Such an inner wall 130 is depicted in FIG. 8.

According to embodiments, the thickness $T_1$ of the inner wall 130 of the multiwall airfoil 22 can be readily inferred, without requiring expensive and time consuming MRI measurements. For example, an outer wall 132 of the multiwall airfoil 22 can be measured (e.g., ultrasonically) at first and second points X, Y to determined thicknesses $T_2$ and $T_3$, respectively. Point X is adjacent an outer cooling passage 126, while point Y is adjacent a protrusion 134 of a center plenum 124 formed by (in this case) a lower boss 34 of a central plenum section 24 of the core 10 (FIG. 7). Since the depth $D_1$ of the outer cooling passage 126 and the depth $D_2$ of the protrusion 134 of the center plenum 124 are known from the dimensions of the corresponding outer passage section 26 and corresponding lower boss 34, respectively, of the core 10, the thickness $T_1$ of the inner wall 130 can be determined as: $T_1=(T_3+D_2)-(T_2+D_1)$. The thickness of the inner wall 130 may be determined in a similar manner at other points of the multiwall airfoil 22.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A core for a turbine airfoil casting, comprising:
a center plenum section; and
a plurality of outer passage sections;
wherein the center plenum section includes a first boss and a second boss extending outwardly from the center plenum section to an outer profile of the core,
wherein the first boss extends outwardly from the center plenum section toward a first side of the core, and the second boss extends outwardly from the center plenum section toward a second side of the core.

2. The core according to claim 1, wherein the first boss has an outer contact surface having a contour matching a contour of a corresponding contact area on a first setter block, and wherein the second boss has an outer contact surface matching a contour of a corresponding contact area on a second setter block.

3. The core according to claim 1, wherein the core is disposed between a first setter block and a second setter block, and wherein the first and second bosses control the position, and prevent movement of, the center plenum section in a cavity formed by the lower setter block and upper setter block during a firing process.

4. The core according to claim 1, wherein the first and second bosses have an elliptical shape.

5. The core according to claim 4, wherein the elliptical shape has a length to width ratio in the range of about 3:1 to about 10:1.

6. The core according to claim 4, wherein the elliptical shape has a length to width ratio of about 7:1.

7. The core according to claim 1, wherein at least one of the first and second bosses extends outwardly from the center plenum section between a pair of the outer passage sections.

8. The core according to claim 1, wherein the first boss is disposed on a pressure side of the core and the second boss is disposed on a suction side of the core.

9. The core according to claim 1, wherein the casting comprises a multiwall airfoil casting.

10. A method for forming a core for a casting, comprising:
positioning a first side of a core on a first setter block, the core comprising a center plenum section and a plurality of outer passage sections, wherein the center plenum section includes a first boss and a second boss extending outwardly from the center plenum section to an outer profile of the core;
closing a second setter block against the second side of the core; and
heating the core,
wherein the first boss extends outwardly from the center plenum section toward a first side of the core, and the second boss extends outwardly from the center plenum section toward a second side of the core.

11. The method according to claim 10, wherein the first boss has an outer contact surface having a contour matching a contour of a corresponding contact area on the first setter block, and wherein the second boss has an outer contact surface matching a contour of a corresponding contact area on the second setter block.

12. The method according to claim 10, further comprising:
controlling, using the first and second bosses, the position of the center plenum sections in a cavity formed by the lower setter block and upper setter block during the heating of the core.

13. The method according to claim 10, further comprising:
preventing, using the first and second bosses, movement of the center plenum sections in a cavity formed by the lower setter block and upper setter block during the heating of the core.

14. The method according to claim 10, wherein the first and second bosses have an elliptical shape.

15. The method according to claim 14, wherein the elliptical shape has a length to width ratio in the range of about 3:1 to about 10:1.

16. A method for measuring a thickness $T_1$ of an inner wall of a multiwall airfoil, the inner wall located between an outer cooling passage and a central plenum of the multiwall airfoil, the central plenum including a protrusion extending toward an outer wall of the multiwall airfoil, the method comprising:
obtaining a thickness measurement $T_2$ of an outer wall of the multiwall airfoil at a first point adjacent the outer cooling passage; and
obtaining a thickness measurement $T_3$ of the outer wall of the multiwall airfoil at a second point adjacent the protrusion of the central plenum;
wherein the thickness $T_1$ of the inner wall of the multiwall airfoil is given by $T_1=(T_3+D_1)-(T_2+D_2)$, wherein $D_1$ is a depth of the outer cooling passage and $D_2$ is a depth of the protrusion of the central plenum, and wherein $D_1$ and $D_2$ are known from corresponding dimensions of a core used to form the multiwall airfoil.

17. The method according to claim 16, wherein the protrusion corresponds to a lower boss or an upper boss of a central plenum section of the core.

* * * * *